July 23, 1929.  E. MONTGOMERY  1,721,869
PEST EXTERMINATOR
Filed June 27, 1927  2 Sheets-Sheet 1
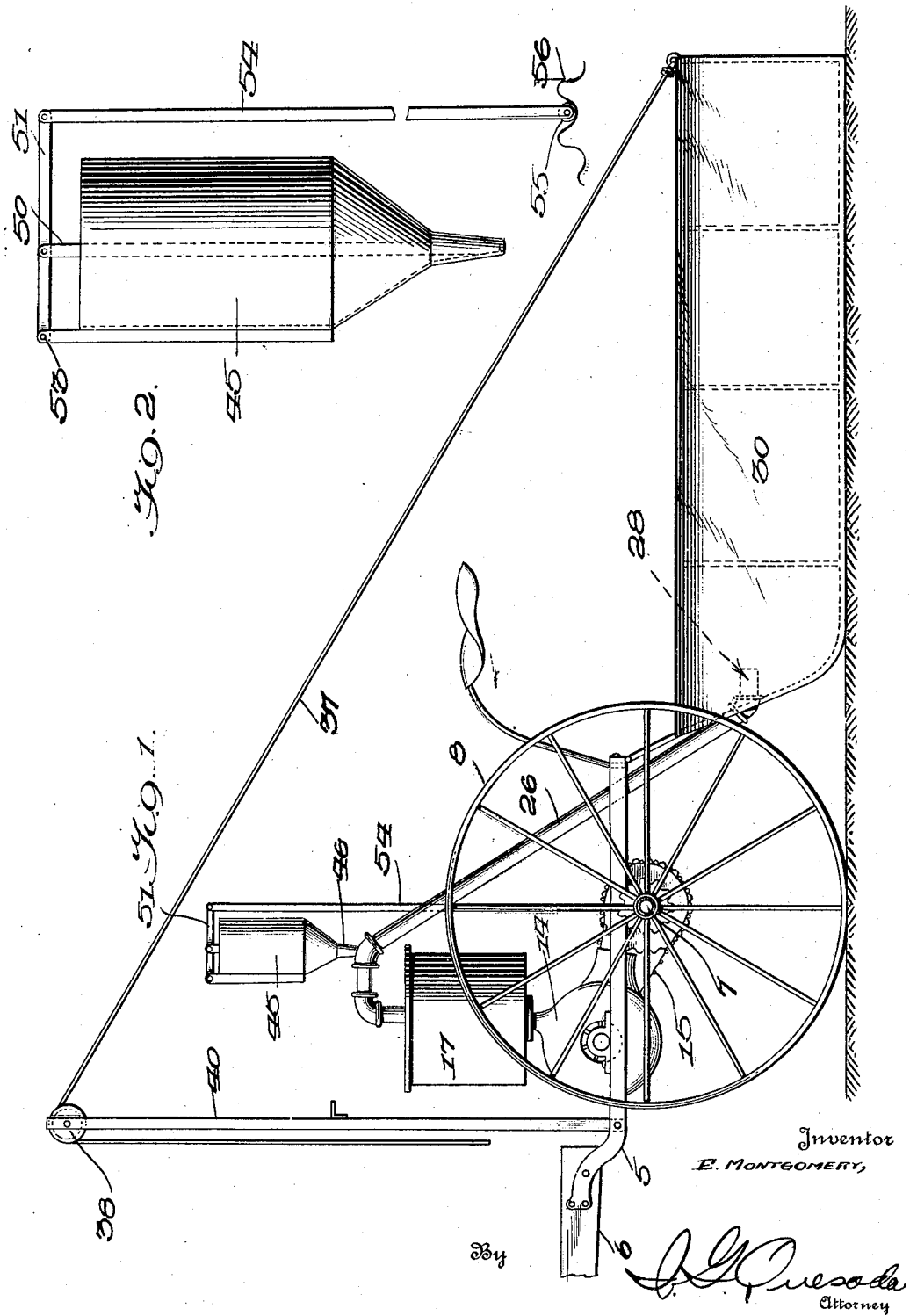

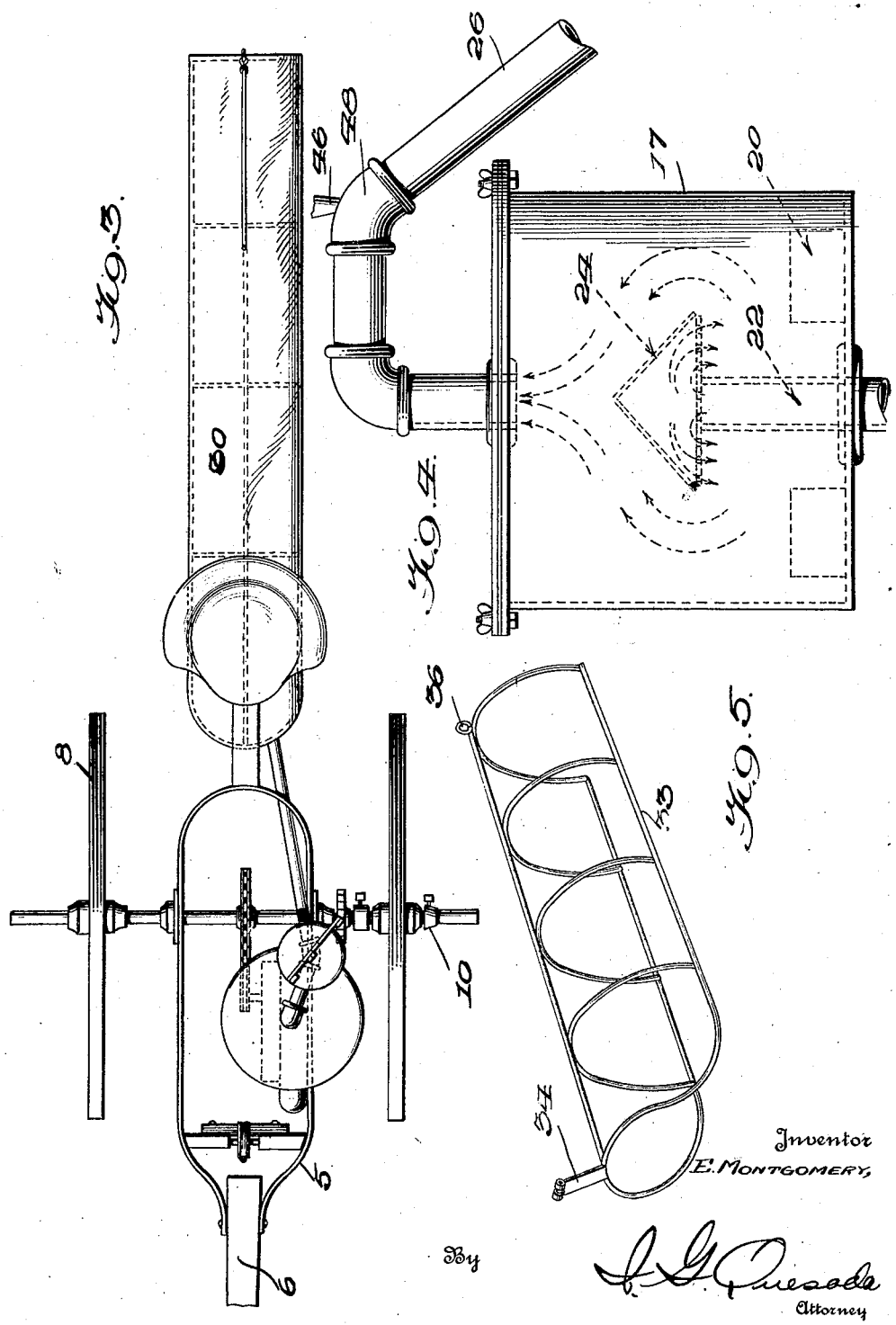

Patented July 23, 1929.

1,721,869

UNITED STATES PATENT OFFICE.

EBEN MONTGOMERY, OF WACO, TEXAS.

PEST EXTERMINATOR.

Application filed June 27, 1927. Serial No. 201,870.

This invention relates to exterminators for boll-weevil and other insects destructive to vegetation such as cotton.

Briefly stated, an important object of the invention is to provide simple and easily operated means whereby sulphur fumes and powdered sulphur may be supplied to a hood or canopy within which a portion of a row of growing cotton is temporarily confined so that any insects such as boll-weevel which may be on the cotton will be destroyed by the fumes, the arrangement being such that the vegetation is not hindered in its development.

A further and equally important object is to provide an insect exterminator which is of highly simplified construction, durable in use, and comparatively cheap to manufacture.

Other objects and advantages will be apparent during the course of the following description.

In the accompanying drawings forming a part of this application and in which like reference characters are employed to designate like parts throughout the same, Figure 1 is a side elevation of the improved insect exterminator;

Figure 2 is a side elevation of a sulphur containing hopper;

Figure 3 is a plan view of the machine;

Figure 4 is a side elevation of a sulphur burning receptacle embodied in the invention;

Figure 5 is a perspective of a frame for a canopy or enclosure adapted to straddle a row of cotton.

In the drawings, the numeral 5 designates the frame of the machine, which frame may be connected to the tongue 6 or to the draw bar cap of a tractor or other propelling means, this feature forming no special part of the invention.

As illustrated in Figure 1, an axle 7 is connected to the frame and is supported by wheels 8 by means of which the machine may be moved along the ground. It will be seen that the wheels are spaced far enough apart to straddle a row of cotton or the like and in fact one or both of the wheels may be held in an adjusted position on the axle by collars 10 secured in place on the axle by set screws or other fastening devices. Thus for a wide row of plants the wheels may be separated more widely than illustrated in Figure 3 and for a narrow row of plants the wheels may be drawn together.

Figures 1 and 2 illustrate that an air blower 14 is carried by the frame and is provided with a fan of conventional or other design turned by a sprocket chain 15 trained about sprocket wheels on the axle and the shaft of the fan. Therefore, when the machine is traveling the fan within the blower will be rapidly rotated to induce a current of air into a sulphur burning container 17.

The sulphur burning container is illustrated in detail in Figure 4 wherein it shows that several sulphur burning lamps or cans 20 may be positioned within the container at opposite sides of the inlet member 22. The inlet member 22 is provided with a cone-shaped baffle 24 by means of which the in rushing air from the blower is deflected downwardly through the perforations in the base of the conical baffle into proximity of the sulphur burners 20. By this arrangement the air from the blower is impregnated with sulphur fumes.

A discharge pipe 26 is connected to the upper portion or top of the sulphur burner and extends downwardly and rearwardly and is provided at the outlet thereof with a nozzle 28. Referring to Figure 1 it will be seen that the nozzle 28 discharges the air impregnated with the sulphur fumes within a canopy 30, the canopy being adapted to straddle a row of cotton or the like so as to temporarily confine the sulphur fumes.

Figure 5 illustrates a frame 33 substantially U-shaped in cross-section and adapted to support the covering of the canopy. In carrying out the invention, the canopy 30 may be of any cross-sectional formation desired and may be of any size to best correspond to the size of the plants.

The forward portion of the frame 33 is provided with a hinge member 34 connected to the frame of the machine for swinging movement about a horizontal axis and the rear portion of the frame is provided with an eye 36 for connection with a flexible element 37 by means of which the canopy may be swung upwardly to an inoperative position. The flexible element 37 is trained about a pulley 38 mounted on a mast or standard 40 and the flexible element terminates adjacent the front of the machine and is within convenient reach of a person standing on the ground.

A hopper 45 for powdered sulphur is provided with an outlet nozzle or funnel-shaped bottom 46 which extends into an angle coupling 48 of the pipe 26 so that the air rushing through the pipe may draw a quantity of powdered sulphur into the pipe. At this point it might be stated that the powdered sulphur when discharged by way of the nozzle 28 may lodge on the leaves of the cotton plants and thereby destroy boll-weevil and other insects which might be on the plants. Of course, the fumes of the sulphur are efficacious, but the action of the powdered sulphur will be of a more lasting nature.

The connection of the nozzle 46 to the angle coupling 48 will form sort of a venturi arrangement by which the sulphur is drawn into and through the pipe 26.

The discharge of the sulphur from the hopper 45 is, however, controlled by a vertically movable valve 50 extended down into the tapered outlet 46 and having connection with a lever 51. Figure 2 illustrates that the lever 51 is fulcrumed at the forward end thereof, as shown at 53, and is connected to an actuating push rod 54, the lower portion of which may be provided with a roller 55 which is periodically raised by the lobes 56 of a cam wheel. Figure 3 clearly illustrates that the cam wheel is rigidly secured on the axle of the machine.

With reference to the foregoing description taken in connection with the accompanying drawings it will be seen that a machine constructed in accordance with this invention is provided with simple and reliable means by which the fumes of sulphur and the sulphur may be supplied to the leaves or other parts of a cotton or other plant so that pests such as boll-weevil will be effectively destroyed. The canopy 30 will provide a means by which the sulphur fumes are at least temporarily confined so that the same may have a destructive force on the pests.

Having thus described the invention, what is claimed is:

An insect exterminator comprising a frame having wheels and an axle, a blower having connection with the axle and actuated thereby, a sulphur burning container connected to the blower to receive air from the same, an outlet pipe connected to the sulphur burning container and having a bend intermediate the ends thereof, a sulphur containing hopper mounted on the outlet pipe and having a discharge pipe extending into said bend to supply powdered sulphur to the pipe, a valve controlling the discharge of the powdered sulphur from said hopper, means to intermittently operate said valve, and a hood receiving one end portion of said pipe.

In testimony whereof I affix my signature.

EBEN MONTGOMERY.